(12) United States Patent
Tada et al.

(10) Patent No.: US 8,325,918 B2
(45) Date of Patent: Dec. 4, 2012

(54) STREAMING SYSTEM FOR DISTRIBUTING ENCRYPTED COMPRESSED IMAGE DATA, AND STREAMING METHOD THEREFOR

(75) Inventors: Keiko Tada, Kanagawa (JP); Ryuji Ishiguro, Tokyo (JP); Motomasa Futagami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1521 days.

(21) Appl. No.: 10/473,284

(22) PCT Filed: Jan. 28, 2003

(86) PCT No.: PCT/JP03/00806
§ 371 (c)(1),
(2), (4) Date: Apr. 22, 2004

(87) PCT Pub. No.: WO03/065726
PCT Pub. Date: Aug. 7, 2003

(65) Prior Publication Data
US 2004/0177267 A1 Sep. 9, 2004

(30) Foreign Application Priority Data
Jan. 30, 2002 (JP) ............................ P2002-022257

(51) Int. Cl.
*H04N 7/167* (2011.01)
(52) U.S. Cl. .................. 380/217; 380/201; 380/216
(58) Field of Classification Search .............. 380/200, 380/201, 216–217
See application file for complete search history.

(56) References Cited

U.S. PATENT DOCUMENTS

| | | | |
|---|---|---|---|
| 5,684,876 A | 11/1997 | Pinder et al. | |
| 5,991,403 A * | 11/1999 | Aucsmith et al. | 380/217 |
| 6,314,137 B1 * | 11/2001 | Ono et al. | 375/240 |
| 6,735,173 B1 * | 5/2004 | Lenoski et al. | 370/235 |
| 6,873,877 B1 * | 3/2005 | Tobias et al. | 700/94 |
| 6,918,034 B1 * | 7/2005 | Sengodan et al. | 713/160 |

(Continued)

FOREIGN PATENT DOCUMENTS

JP   8-265723   10/1996

(Continued)

OTHER PUBLICATIONS

Shaowen Yan, JP-2001-251599, pp. 1-14, Sep. 14, 2001.*

(Continued)

*Primary Examiner* — Edan Orgad
*Assistant Examiner* — Canh Le
(74) *Attorney, Agent, or Firm* — Finnegan, Henderson, Farabow, Garrett & Dunner, L.L.P.

(57) ABSTRACT

The present invention is directed to a streaming system for encrypting compression-encoded image data to distribute it via network of a predetermined transport protocol, and a streaming server used in this system transmits, to a client terminal, on the RTP packet basis, stream data encrypted so that encryption is performed every encryption block size from the leading portion of each GOP without encrypting the last data having less than encryption block size. In this instance, portions of prior and/or posterior stream data are stored into an extended area of RTP header so that size of stream data transmitted every RTP packet is integral multiple of encryption block size. Further, size information of added prior additional data and/or posterior additional data are also stored into the extended area. This streaming server suppresses increase in size by encryption to have ability to support both real time production and down-load reproduction without replacement of encryption.

21 Claims, 8 Drawing Sheets

U.S. PATENT DOCUMENTS

| | | | |
|---|---|---|---|
| 7,010,032 B1 | 3/2006 | Kikuchi et al. | |
| 7,085,377 B1* | 8/2006 | Norr | 380/37 |
| 7,434,052 B1* | 10/2008 | Rump | 713/171 |
| 7,447,313 B2* | 11/2008 | Van Rijnsoever | 380/207 |
| 2002/0090086 A1 | 7/2002 | Van Rijnsoever et al. | |
| 2002/0090138 A1* | 7/2002 | Hamanaka | 382/239 |
| 2002/0150244 A1 | 10/2002 | Kim et al. | |

FOREIGN PATENT DOCUMENTS

| | | |
|---|---|---|
| JP | 2001-175793 | 6/2001 |
| JP | 2001-251599 | 9/2001 |
| JP | 2002-507868 | 3/2002 |
| JP | 2002-374511 | 12/2002 |
| JP | 2002-541687 | 12/2002 |
| JP | 2003-507974 | 2/2003 |
| WO | WO 99/48296 | 9/1999 |
| WO | WO 00/48375 | 8/2000 |
| WO | WO 00/60846 | 10/2000 |
| WO | WO 01/15448 | 3/2001 |

OTHER PUBLICATIONS

Kikuchi et al., "RTP Payload Format for MPEG-4 Audio/Visual Streams", Nov. 2000, pp. 1-21.*

Y. Kikuchi et al., "RTP Payload Format for MPEG-4 Audio/Visual Stream," Network Working Group, Request for Comments: 3016, Category, Standards Track, The Internet Society, Nov. 2000, pp. 1-21.

Schulzrinne et al., "RTP: A Transport Protocol for Real-Time Applications," Internet Engineering Task Force, Internet Draft, Audio/Video Transport Working Group, Jul. 20, 2001, pp. 1-104.

Susie J. Wee et al., "Secure Scalable Video Streaming for Wireless Networks," Streaming Media Systems Group, Hewlett-Packard Labrotories, Palo Alto, California, USA, 2001, pp. 2049-2052.

* cited by examiner

STREAMING SYSTEM FOR DISTRIBUTING ENCRYPTED COMPRESSED IMAGE DATA, AND STREAMING METHOD THEREFOR

TECHNICAL FIELD

The present invention relates to a streaming system and a streaming method therefor, a streaming server and a data distribution (delivery) method therefor, a client terminal and a data decoding method therefor, an authoring apparatus and an authoring method therefor, a program and a recording medium which are adapted for encrypting compression-encoded image data to distribute it via network of a predetermined transport protocol.

This application claims priority of Japanese Patent Application No. 2002-022257, field on Jan. 30, 2002, the entirety of which is incorporated by reference herein.

BACKGROUND ART

In recent years, in transmission of video data and audio data on the Internet, there are down-load type transmission system and stream type transmission system. In this down-load type transmission system, video file which has been transmitted from distribution server is temporarily stored at the terminal side, and data (video data) of video file is then reproduced. For this reason, in this system, until transfer of file is completed, it is impossible to reproduce data at the terminal side. The down-load type transmission system is unsuitable for use in long hour reproduction of video data, etc.

On the other hand, in the stream type transmission system, also for a time period during which data is transmitted from a streaming server to the terminal, received data is reproduced. In this stream type transmission system, system using protocol called RTP (Real-Time Transport Protocol) prescribed in the RFC 1889 of IETF (Internet Engineering Task Force) is the main current.

Meanwhile, in recent years, there has been great demand for security countermeasure by encryption communication. For example, there has been proposed IPSec (IP Security Protocol) for encrypting, at IP (Internet Protocol) level, all communication data transmitted from Host without merely encrypting only communication data by a specific application, etc. This IPSec is strandard requirements for encryption communication that the IETF is proceeding with standardization.

In this IPSec, since padding or padding size, etc. caused to be in correspondence with block size is added to payload data to thereby perform encryption communication, there is the problem that encryption/decoding is required at the communication portion of the transmitting side and the receiving side so that mounting by the existing distribution tool is difficult.

In the case where padding or padding size is added, size of encrypted data becomes greater than actual data, so change of size takes place before and after encryption. For this reason, there was the problem that bit rate of stream and/or file size change. In addition, since the number of data transmitted by streaming becomes large, there is the problem that performance of streaming is lowered.

It is also conceivable to encrypt image data which has been compression-encoded by the MPEG4 (Moving Picture Experts Group 4) to perform streaming of the encrypted image data. Here, in the MPEG4, it is prescribed at RFC3016 that data is transmitted in video packet units at the time of streaming. However, since break of video packet and break of encryption block do not coincide with each other, encryption cannot be completed in video packet units. In the case where video packet is missing by transmission error, etc., there is the problem that not only that video packet, but also video packets before and after cannot be decoded.

DISCLOSURE OF THE INVENTION

An object of the present invention is to provide a streaming system and a streaming method therefor which can solve problems of conventionally proposed data transmission methods as described above.

Another object of the present invention is to provide a streaming system and a streaming method therefor, a streaming server and a data distribution (delivery) method therefor, a client terminal and a data decoding method therefor, an authoring apparatus and an authoring method therefor, a program and a recording medium which are adapted for suppressing increase in size by encryption to have ability to cope with both operation at the time of stream and operation at the time of down-load reproduction.

A streaming system according to the present invention comprises: an encryption unit for, in encrypting stream data which is obtained by compression-encoding image data and/or audio data, encrypting every predetermined unit of the stream data from the leading portion of the predetermined unit on an encryption block size basis without encrypting the last data having less than the encryption block size; an authoring unit for adding at least packeting control information to the encrypted stream data to prepare a file so that the file has a predetermined file form; a streaming server for distributing the file prepared by the authoring unit via network of a predetermined transport protocol; and a client terminal for receiving the encrypted stream data from the streaming server to decode encrypted portion of the stream data into original image data.

Here, the streaming server packetizes by storing portions of prior an/or posterior stream into an extended area along with the stream data on the basis of the packeting control information so that size of stream data distributed every packet is integral multiple of the encryption block size to have ability to distribute stream data thus generated to the client terminal on the packet basis.

The streaming server may switch, in accordance with communication state of network, between a first packeting technique of packetizing by storing portions of prior and/or posterior stream data into an extended area along with the stream data so that size of stream data distributed every packet is integral multiple of the encryption block size, and a second packeting technique of packeting stream data with integral multiple of the encryption block size being a unit every predetermined unit to distribute stream data thus generated to client terminal on the packet basis.

In streaming of stream data which has been padded and encrypted every predetermined unit so that its size is integral multiple of encryption block size, the streaming server packetizes by storing portions of prior and/or posterior stream data into an extended area along with the stream data on the basis of the packeting control information so that size of stream data distributed every packet is integral multiple of encryption block size to have ability to distribute stream data thus generated to the client terminal on the packet basis.

Still more further objects of the present invention and practical merits obtained by the present invention will become more apparent from the description of the embodiments which will be given below with reference to the attached drawings.

BRIEF DESCRIPTION OF THE DRAWINGS

FIGS. 3A to 3C are views for explaining video packet, wherein

FIGS. 8A and 8B are views for explaining RTP packet used in the present invention, wherein

BEST MODE FOR CARRYING OUT THE INVENTION

Embodiments of the present invention will now be described in detail with reference to the attached drawings. In this embodiment, the present invention is applied to a contents distribution system adapted for encrypting image data which has been compression-encoded by the MPEG4 (Moving Picture Experts Group 4) to have ability to distribute such image data on the real time basis to client terminal, or to down-load it with respect to client terminal. It is to be noted that while the present invention can be applied also to audio data which has been compression-encoded by, e.g., MPEG audio system, explanation will be particularly given only in connection with image data.

The conceptual configuration of the contents distribution system to which the present invention is applied will be explained with reference to FIG. 1.

Figure 1:
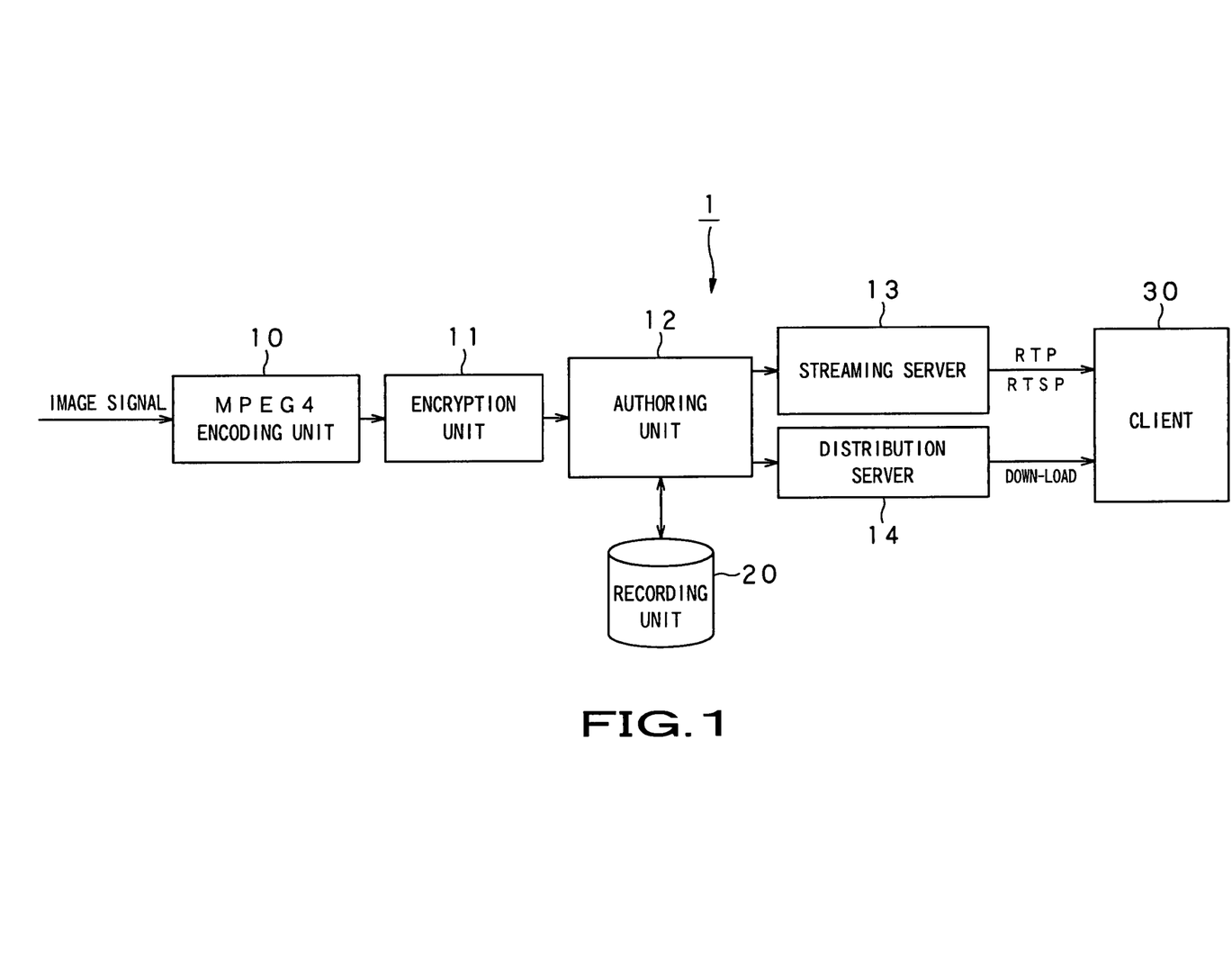
FIG. 1 is a view for explaining the conceptual configuration of a contents distribution system to which the present invention is applied.

The contents distribution system 1 to which the present invention is applied is composed, as shown in FIG. 1, of a MPEG4 encoding unit 10, an encryption unit 11, an authoring unit 12, a streaming server 13, a distribution server 14, a recording unit 20, and a client terminal 30. It is to be noted that in the case where this contents distribution system 1 is constituted as a streaming system, the distribution server 14 can be omitted. As this streaming technology, QuickTime (Registered Trademark) by Apple corporation, etc. may be used.

In FIG. 1, an image signal which has been inputted from a moving picture input unit such as camera or VTR, etc. (not shown) and has been converted into a digital signal is first inputted to the MPEG4 encoding unit 10.

The MPEG4 encoding unit 10 serves to allow the image signal to undergo MPEG4 compression-encoding by using DCT, quantization, variable length encoding, inverse-quantization, inverse-DCT and/or motion compensation, etc. to generate stream data. The MPEG4 encoding unit 10 delivers the generated stream data to the encryption unit 11.

Figure 2:
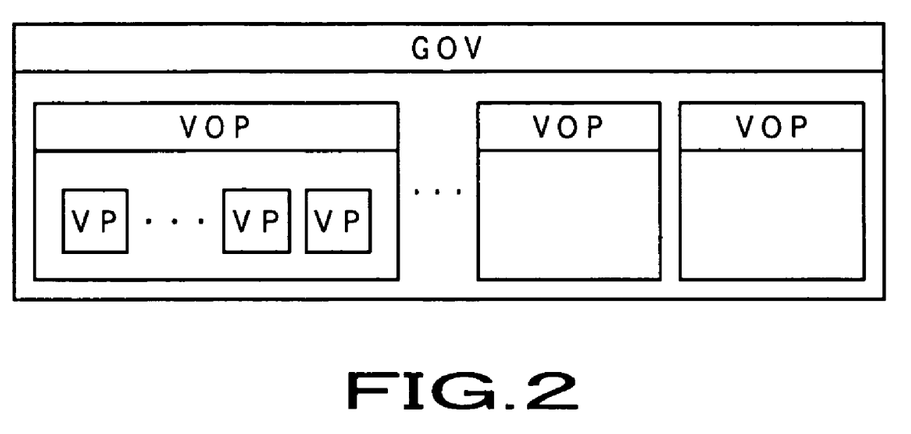
FIG. 2 is a view for explaining the structure of stream data generated at MPEG4 encoding unit of the contents distribution system.

Here, stream data generated at the MPEG4 encoding unit 10 is of the structure as shown in FIG. 2 when simply referred to. As shown in FIG. 2, the MPEG4 image compressed information is of the configuration in which plural GOVs (Group of VOP) including time information for performing random access, etc. exist, wherein respective GOVs consist of plural VOPs (Video Object Plane). In this case, this VOP corresponds to frame.

Figure 3A:
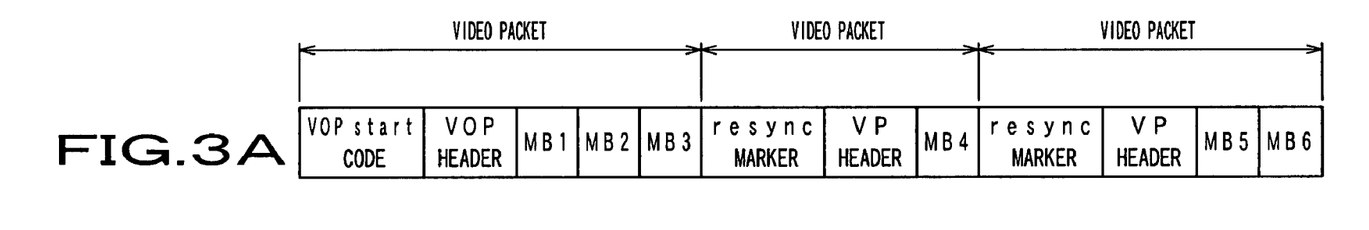
FIG. 3A shows the structure of video packet.

VOP is partitioned into units called Video Packet (VP) consisting of several macro blocks. Here, as shown in FIG. 3A, among respective video packets, VOP header serving as frame header information is added to the first video packet of frame (VOP), and video packet header information (VP header) is added to video packets except for the first portion of frame. Markers (RM: Resynchronization marker) for realizing synchronization recovery are added to the leading portions of respective video packets of video code trains.

Figure 3B:
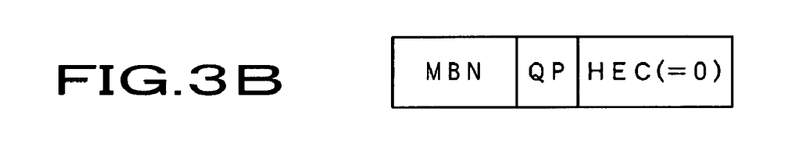
FIG. 3B shows the detail of video packet header information.
Figure 3C:
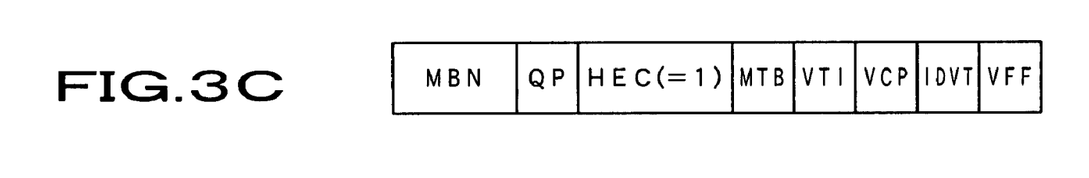
FIG. 3C shows the detail of video packet header information in the case where HEC flag within video packet header is 1.

The detail of video packet header information is shown in FIG. 3B. As shown in FIG. 3B, flag of HEC (Header Extension Code) is included in video packet header. In the case where this flag is "1", information such as time code MTB and VTI (time stamp) information included in VOP header, encoding mode information VCP of VOP serving as information relating to encoding of frame, VLC cable switching information IDVT for intra DC, and motion vector range information VFF, etc. are added also to the video packet header as shown in FIG. 3C.

Returning to FIG. 1, the encryption unit 11 encrypts, every predetermined encryption block, stream data which has been delivered from the MPEG encoding unit 10.

Figure 4:
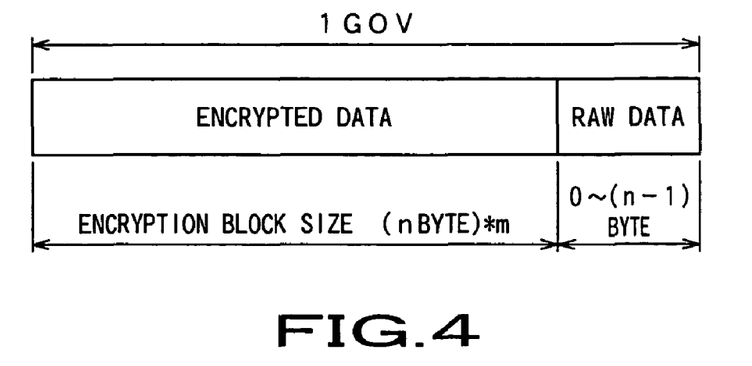
FIG. 4 is a view for explaining encryption technique used in the present invention.

In this instance, as shown in FIG. 4, there are instances where data of remainder which cannot be divided by encryption block size every respective GOVs may take place. Hitherto, in such case, padding was added so that data size of each GOV is integral multiple of encryption block size. However, in this invention, such remainder data is not encrypted, but is caused to remain raw (original) data. Namely, when encryption block size is assumed to be n bytes, only the first n*m byte (m is integer equal to zero or more) of each GOV is encrypted, and 0 to (n−1) bytes of remainder are caused to be raw (original) data. Thus, data can be encrypted without increasing data size. As a result, there is no possibility that data size may change before and after encryption.

Figure 5:
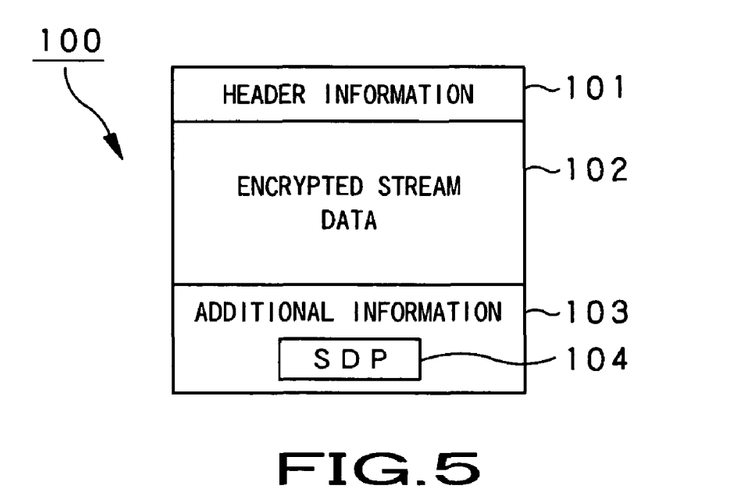
FIG. 5 is a view for explaining file prepared at authoring unit of the contents distribution system according to the present invention.

As shown in FIG. 5, the authoring unit 12 adds header information 101 and additional information 103 including described SDP (Session Description Protocol) file 104 such as packeting control information, etc. to stream data 102 encrypted at the encryption unit 11 to prepare file 100 of a predetermined form to record it with respect to the recording unit 20. The authoring unit 12 suitably takes out that file 100 to deliver it to the streaming sever 13 or the distribution server 14. It is to be noted that this file 100 may be recorded with respect to recording medium (not shown) to deliver that recording medium to the streaming server 13 or the distribution server 14.

The streaming server 13 packets encrypted stream data 102 of the delivered file 100 on the basis of packeting control information to distribute data to the client terminal 30 every packet in accordance with PTP and RTSP (Real-Time Streaming Protocol) to allow the client terminal 30 to reproduce data in real time.

On the other hand, the distribution server 14 permits the delivered file 100 to be down-loaded with respect to the client terminal 30.

Figure 6:
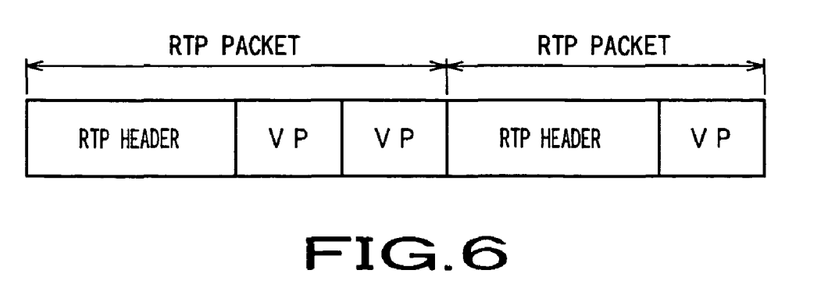
FIG. 6 is a view for explaining RTP packet and video packet in RFC 3016.
Figure 7:
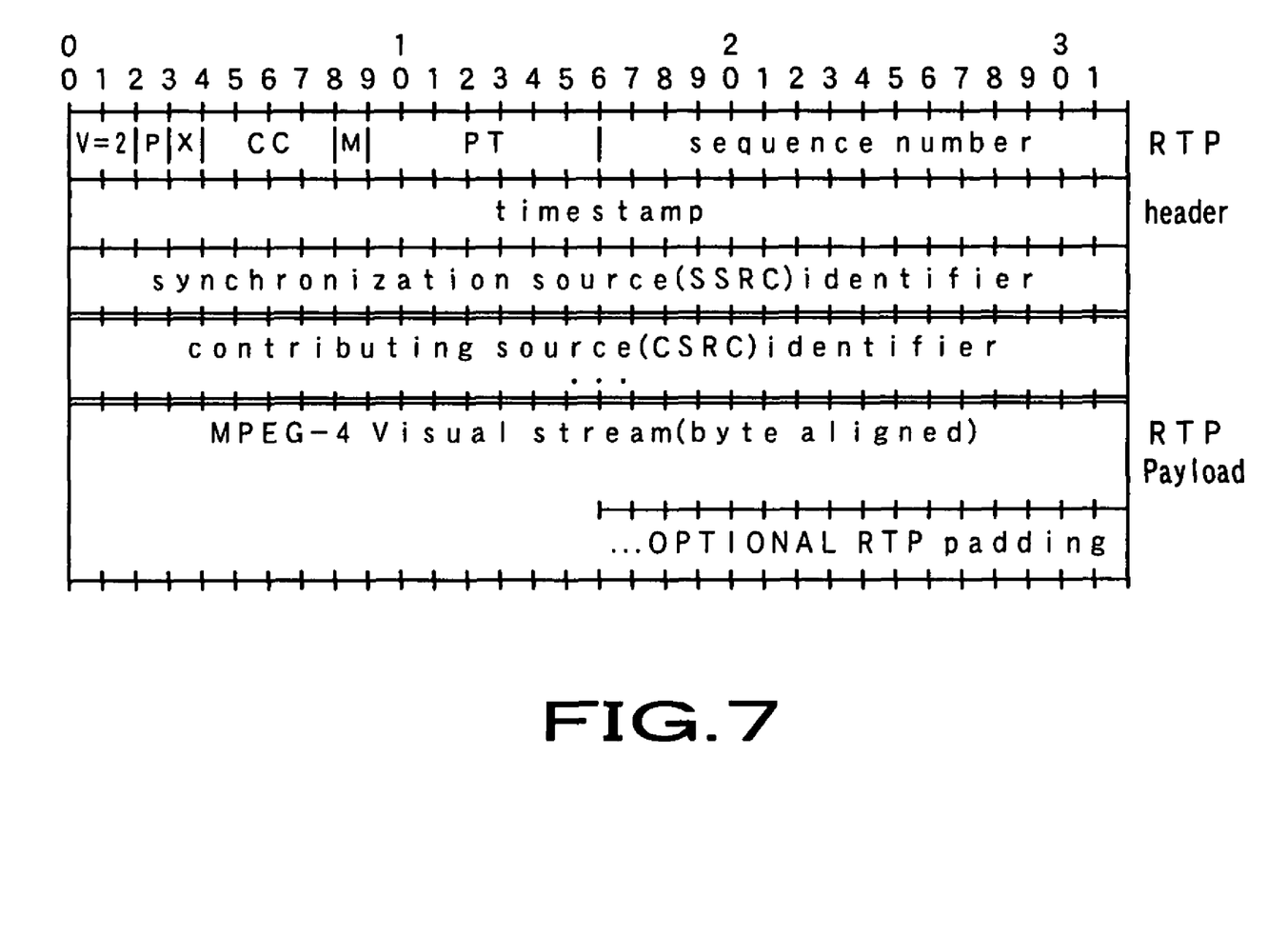
FIG. 7 is a view for explaining RTP packet in detail.

Meanwhile, at RFC3016, as shown in FIG. 6, it is defined that one or more video packets are collected to transmit it as one RTP packet. An example of this RTP packet is shown in FIG. 7. It is to be noted that, in the example of FIG. 7, it is indicated that RTP packet is partitioned every 32 bits and partitioned ones are arranged, and 00~31 of the abscissa indicate bit position partitioned into 32 bits.

In FIG. 7, V, P, X . . . to CSRC indicated at RTP header correspond to RTP header shown in FIG. 6. In FIG. 7, X indicates extension bit, wherein when X is equal to 1, extended area is added to the last portion of the RTP header. In addition, M indicates marker bit, wherein only in the case where the last video packet of each VOP is included in RTP packet, M is caused to be equal to 1.

Stream data is inserted into RTP Payload every video packet more than 1. It is to be noted that in the case where the number of bits of RTP packet is not multiple of 32 bits, bit train called RTP Padding may be supplemented to the last portion of the RTP payload so that the number of bits of the RTP packet becomes equal to multiple of 32 bits.

Here, at RFC3016, break of video packet and break of encryption block serving as unit of encryption are not in correspondence with each other so that encryption cannot be completed in video packet units. For this reason, when transmission path error such as packet loss, etc. takes place on the transmission path, there is the problem that not only missing video packet, but also video packets before and after that packet cannot be decoded.

Figure 8A:
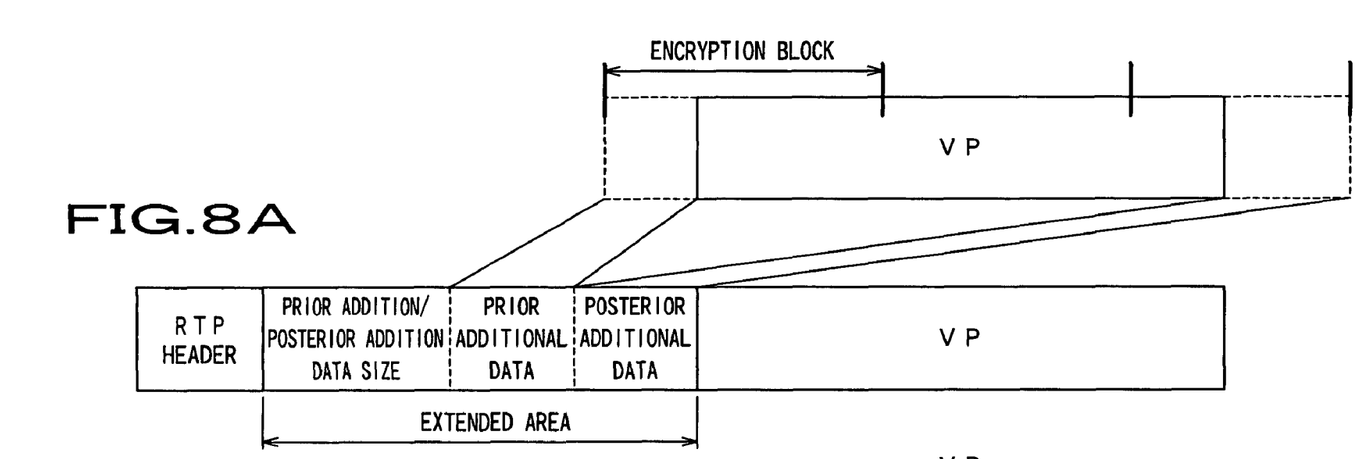
FIG. 8A shows an example of RTP packet in the middle of GOP.

In view of the above, the streaming server 13 according to the present invention adds data of encryption block boundary necessary for decoding by utilizing the extended area within RTP header to packet data. More particularly, as shown in FIG. 8A, data of prior and posterior video packets serving as boundary of encryption block are added to the extended area so that size of stream data transmitted every packet is integral multiple of encryption block size. Further, also with respect to information of size of data in the added prior video packet (prior addition data size) and size of data in the added posterior video packet (posterior addition data size), addition to the extended area thereof is provided.

Figure 8B:
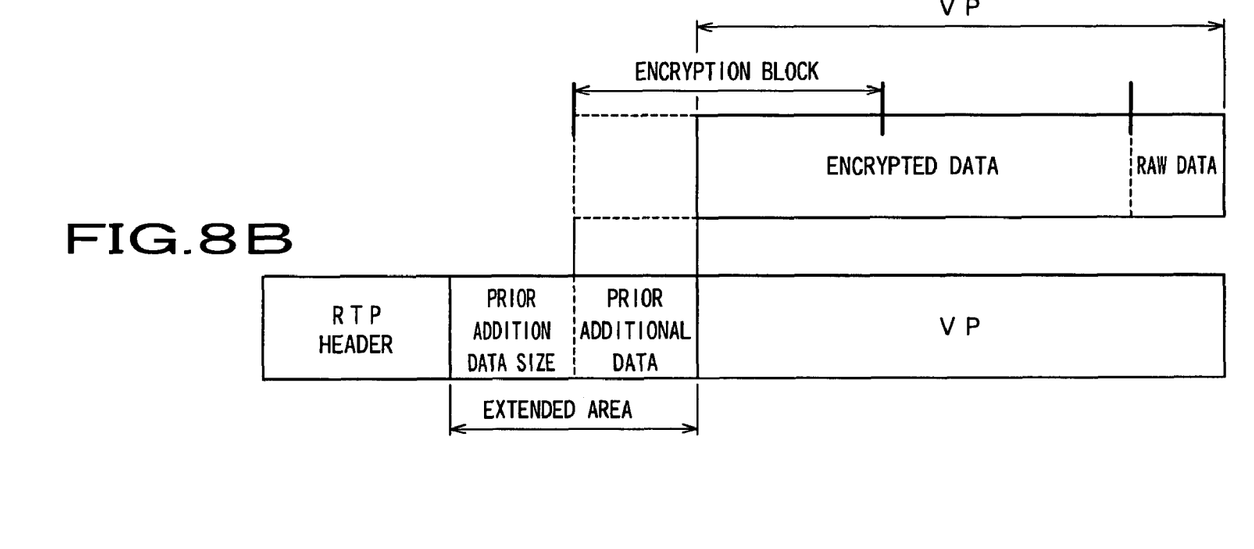
FIG. 8B shows an example of RTP packet of the last of GOP.

The last raw data of GOV is packeted into the form as shown in FIG. 8B. In this case, data of encryption block boundary is added only to the prior portion so that it is understood that data which could not be divided by encryption block length is raw data. For this reason, it is possible to transmit data without adding size of raw data.

By transmitting data in the state where data of encryption block boundary necessary for decoding is added to the extended header area of RTP packet in this way, it is possible to decode data also in the case where packet is missing in streaming.

Figure 9:
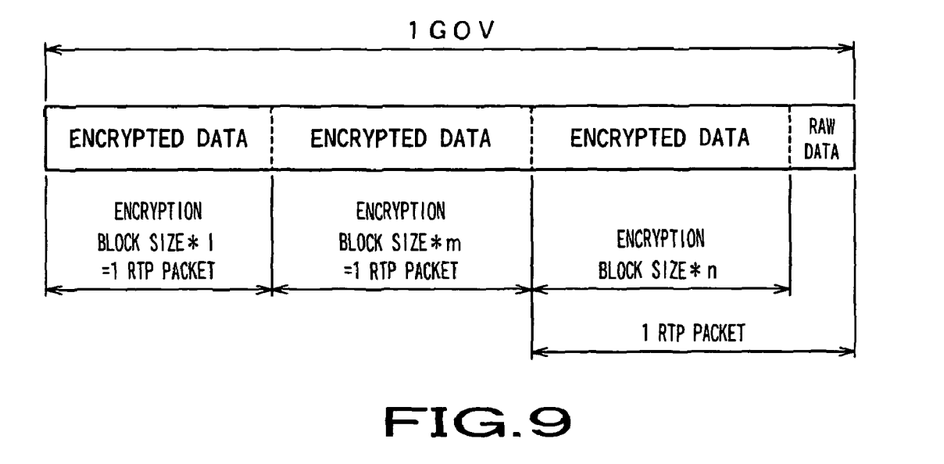
FIG. 9 is a view for explaining another example of RTP packet according to the present invention.

It is to be noted that in the case where streaming is performed under the environment such that missing of packet takes place in a burst manner, stream data may be transmitted in the state where it is partitioned by integral multiple of encryption block size as shown in FIG. 9 in place of employing the approach as described above in which integral multiple of video packet is caused to be transmitting unit. Namely, e.g., one time or m times of encryption block size is or are caused to be transmitting unit to constitute one RTP packet. In this instance, with respect to the last raw data of GOV, e.g., raw data is added to stream data of n times of encryption block size existing immediately before raw data to constitute one RTP packet. In this case, it is indicated that remainder data which cannot be divided by encryption block size is raw data.

Moreover, in accordance with communication circumstances of transmission path such as error rate, etc., there may be employed an approach of switching between the above-mentioned two kinds of transmitting methods. In this contents distribution system 1, since additional information such as packeting control information, etc. is added to file separately from stream data, it is possible to change transmitting unit of stream data without depending upon stream data.

The RTP packet generated as described above is distributed to the client terminal 30 on the real time basis.

In view of the above, explanation will be given below in connection with the decoding/reproducing technique at the client terminal 30. In this case, since reproduction after download is similar to the ordinary reproducing procedure, explanation will be omitted, and only the real time reproducing technique at the client terminal 30 in the case where streaming is performed will be explained.

Figure 10:
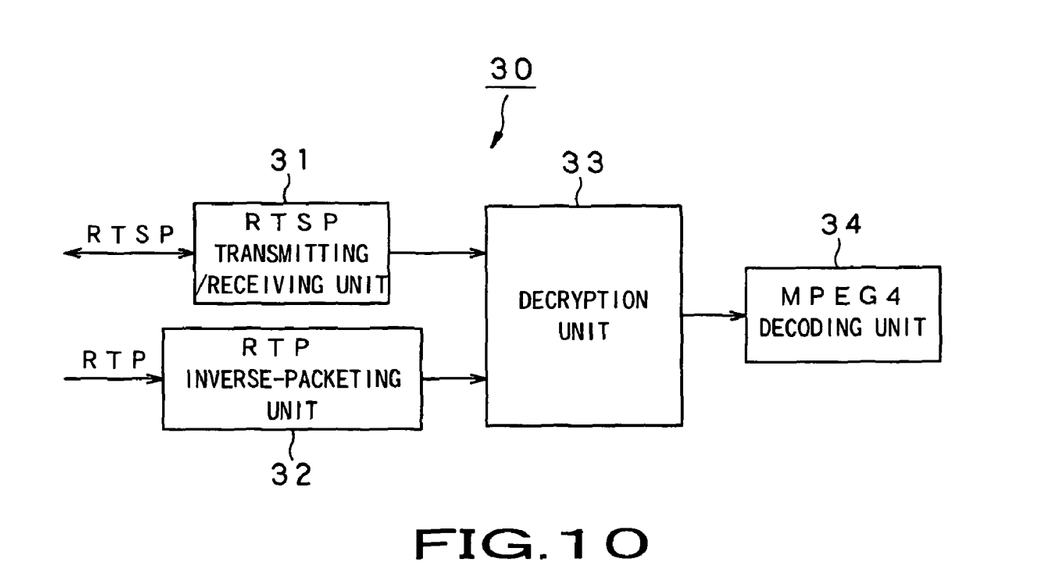
FIG. 10 is a view for explaining outline of the configuration of client terminal of the contents distribution system according to the present invention.

As shown in FIG. 10, the client terminal 30 is composed of a RTSP transmitting/receiving unit 31, a RTP inverse-packeting unit 32, a decryption unit 33, and a MPEG4 decoding unit 34. It is to be noted that only the portion necessary for explanation of real time reproduction is indicated.

The RTSP transmitting/receiving unit 31 first delivers request for image data to the streaming server 13 in accordance with RTSP to receive the above-described SDP file from the streaming server 13. The RTSP transmitting/recording unit 31 judges on the basis of that SDP file whether or not handling can be made to deliver reproduction command to the streaming server 13. Moreover, the RTSP transmitting/receiving unit 31 can deliver, to the streaming server 13, command such as stop, fast feed, rewind and/or reproduction from designated position, etc. in accordance with RTSP. Thus, at the client terminal 30 side, it is possible to operate data of the streaming server 13.

The RTP inverse-packeting unit 32 collects, in VOP units as explained below, stream data transmitted in RTP packet units in accordance with reproduction command from the RTSP transmitting/receiving unit 31 to deliver it to the decryption unit 33.

Figure 11:
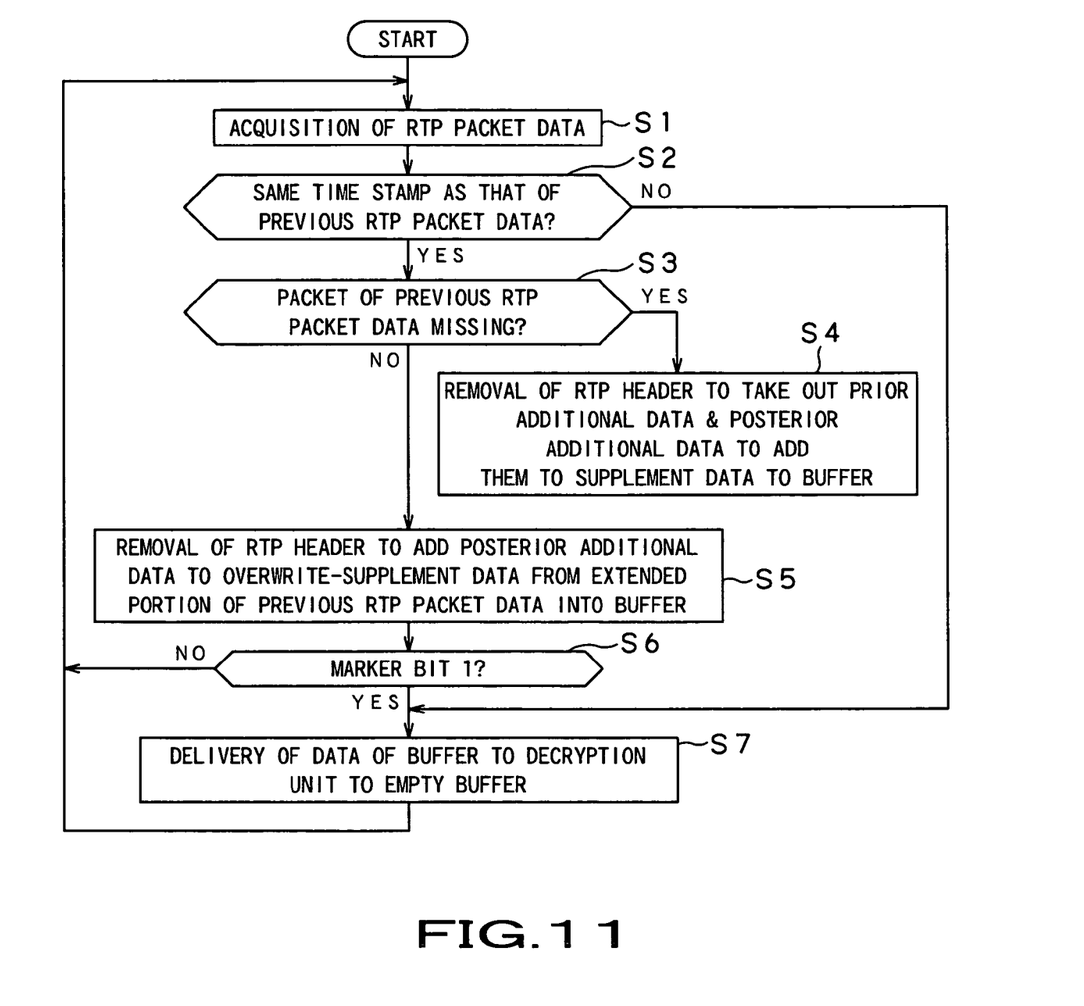
FIG. 11 is a flowchart for explaining the operation of RTP inverse-packeting unit of client terminal according to the present invention.

Here, explanation will be given by using the flowchart of FIG. 11 in connection with the operation of the RTP inverse-packeting unit 32 of the client terminal 30.

First, at step S1, RTP packet data is acquired. At step S2, whether or not the acquired RTP packet data has the same time stamp as that of the previous RTP packet data is discriminated. At the step S2, in the case where that RTP packet data has the same time stamp as that of the previous RTP packet data, processing proceeds to step S3. In the case where that RTP packet data has not the same time stamp as that of the previous RTP packet data, processing proceeds to step S7.

At the step S3, whether or not packet of the previous RTP packet data is missing is discriminated. In the case where packet of the previous RTP packet data is missing at the step S3, processing proceeds to step S4. In the case where packet of the previous RTP packet data is not missing, processing proceeds to step S5.

At the step S4, RTP header is removed to take out the prior additional data and the posterior additional data which have been described above to add them. Further, this data is supplemented to buffer. Thus, processing proceeds to step S6.

At the step S5, RTP header is removed to take out the above-described posterior additional data to add it. Further, this data is caused to undergo overwrite supplement from the extended portion of data immediately before supplemented to the buffer. Thus, processing proceeds to the step S6.

At the step S6, whether or not marker bit is equal to 1 is discriminated. In the case where marker bit is equal to 1 at the step S6, processing proceeds to step S7. In the case where marker bit is not equal to 1, processing returns to the step S1.

At the step S7, data stored in the buffer is delivered to the decryption unit 33, and the buffer is emptied.

It is to be noted that, at the step S7, also in the case where it is discriminated at the step S2 that current RTP packet data has not the same time stamp as that of the previous RTP packet data, data of buffer is delivered to the decryption unit 33 to empty the buffer. By comparing time stamps in this way, also in the case where RTP packet including the last video packet of each VOP in which, e.g., marker bit M is caused to become equal to 1 is missing, it is possible to judge end of VOP.

In this way, data which have been delivered to the decryption unit 33 every respective VOPs are decoded at the decryption unit 33, and are then decoded into original image signal at the MPEG4 decoding unit 34, and are caused to undergo real time reproduction.

As explained above, in accordance with the contents distribution system 1 according to the present invention, there is employed approach to perform encryption on an encryption block size basis from the leading portion of each GOP, without encrypting the last data having less than encryption block size, thereby making it possible to suppress increase in size by encryption.

Further, portions of prior and/or posterior stream data are packeted in the state where they are stored into extended area so that size of stream data distributed every packet is integral multiple of encryption block size to packet data, or stream data is packeted every GOP with integral multiple of encryption block size being a unit so that both real time reproduction and down-load reproduction can be supported without replacement of encryption.

It is to be noted that the present invention is not limited to the above-described embodiments, but it is a matter of course that various changes or modifications can be made within the scope which does not depart from the gist of the present invention.

While it has been described in the above-described embodiment that, e.g., the last data which could not be divided by encryption block size is assumed to be raw data without performing encryption thereof every respective GOPs, the present invention is not limited to such implementation. There may be employed an approach to add padding to the last data which could not be divided by the encryption block size every respective GOPs to perform encryption. Also in this case, portions of prior and/or posterior stream data are packeted so that they are stored into extended area so that size of stream data distributed every packet is integral multiple of encryption block size, whereby data can be decoded also in the case where packet is missing.

While it has been explained in the above-described embodiment that data of prior and posterior video serving as boundary of encryption block are added to extended area, the present invention is not limited to such implementation. There may be employed an approach to insert, e.g., data of prior and posterior video packet into RTP payload so that size of stream data transmitted every packet integral multiple of encryption block size.

Further, without limiting to execution of encryption every respective GOPs, data which could not be divided by encryption block size may be caused to be raw data without performing encryption thereof every respective VOPs.

While the present invention has been explained as the configuration of hardware in the above-described embodiment, the present invention is not limited to such implementation. Processing of the authoring unit 12, the streaming server 13 and the client terminal 30 may be realized by allowing the CPU (Central Processing Unit) to respectively execute computer program. In this case, that computer program can be provided in the state where it is recorded with respect to the recording medium.

Further, while explanation has been given in the above-described embodiment only in connection with image data which has been compression-encoded by MPEG4, the present invention is not limited to such implementation. For example, the present invention may be applied also to audio data which has been compression-encoded by MPEG4.

Namely, various hierarchical structures are conceivable in dependency upon standard also with respect to audio data, but encryption of the last data which is not divided by encryption block size is not performed every predetermined unit, thereby making it possible to provide effects/advantages similar to those in the case of image data. In addition, in the MPEG audio system, data can be inserted into RTP payload in MPEG4 audioMuxElement units or units obtained by dividing them. Also in this case, portions of prior and/or posterior stream data are packeted in the state where they are stored into extended area so that size of stream data distributed every packet is integral multiple of encryption block size, whereby data can be decoded also in the case where packet is missing.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as ser forth and defined by the appended claims.

INDUSTRIAL APPLICABILITY

As described above, the streaming system according to the present invention comprises: encryption unit for, in encrypting stream data which is obtained by compression-encoding image data and/or audio data, encrypting every predetermined unit of the stream data from the leading portion of the predetermined unit on an encryption block size basis without encrypting the last data having less than encryption block size; authoring unit for adding at least packeting control information to the encrypted stream data to prepare a file so that the file has a predetermined file form; streaming server for distributing the file prepared by the authoring unit via network of a predetermined transport protocol; and client terminal for receiving the encrypted stream data from the streaming server to decode the encrypted portion of the stream data into the original image data.

Here, the streaming server packetizes by storing portions of prior and/or posterior stream data into extended area along with the stream data on the basis of the packeting control information so that size of stream data distributed every packet is integral multiple of the encryption block size to have ability to distribute stream data thus generated to the client terminal on the packet basis.

Moreover, the streaming server may switch, in accordance with communication state of network, between first packeting technique of packetizing by storing portions of prior and/or stream data into extended area along with the stream data so that size of the stream data distributed every packet is integral multiple of the encryption block size and second packeting technique of packeting stream data with integral multiple of the encryption block size being a unit every predetermined unit to distribute stream data thus generated to the client terminal on the packet basis.

In streaming of stream data which has been padded and encrypted every predetermined unit so that its size is integral multiple of encryption block size, the stream server packetizes by storing portions of prior and/or posterior stream into an extended area along with the stream data on the basis of the packeting control information so that size of stream data distributed every packet is integral multiple of encryption block size to have ability to distribute stream data thus generated to the client terminal on the packet basis.

In accordance with such a streaming system, there is employed approach to encrypt every predetermined unit of the stream data from the leading portion of the predetermined unit on an encryption block size basis without encrypting the last data having less than encryption block size, thereby making it possible to suppress increase in size in encryption of stream data.

At least packeting control information is added so that encrypted stream data has a predetermined file form to prepare file, thereby making it possible to packet file on the basis of that packeting control information in streaming reproduction, and to down-load that file in down-load reproduction. Thus, it is possible to support both streaming reproduction and down-load reproduction.

In packeting operation, portions of prior and/or posterior stream data are packeted in the state where they are stored into extended area so that size of stream data distributed every packet integral multiple of encryption block size, or to stream data is packeted with integral multiple of encryption block size being a unit every predetermined unit, whereby data can be decoded even in the case where packet is missing.

The invention claimed is:

1. A client terminal connected to a streaming server, the client terminal comprising:
    a central processing unit;
    a receiving unit for receiving packets from the streaming server,
        wherein the streaming server transmits the packets of stream data based on packeting control information,
        wherein the packeting control information and header information are added to the stream data after encryption of the stream data,
        wherein the stream data is generated based on compression-encoding of at least one of image data and audio data,
        wherein the encryption of the stream data comprises encrypting every predetermined unit of the stream data from a leading portion of the predetermined unit based on an encryption block size smaller than a packet size, and
        wherein remainder data of the stream data is not encrypted when a size of the remainder data is smaller than the encryption block size;
    an inverse-packeting unit for inverse-packeting the packets for the stream data;
    a decrypting unit for decrypting encrypted portion of the stream data; and
    a decoding unit for decoding the stream data into the at least one of image data and audio data.

2. The client terminal according to claim 1, wherein the compression-encoding is based on predictive encoding.

3. The client terminal according to claim 2, wherein the predetermined unit is a frame of the image data.

4. The client terminal according to claim 1, wherein a packet is adapted, during packeting of the packets, so that portions of at least one of prior stream data and posterior stream data are stored into an extended area along with the stream data so that size of the stream data distributed to every one of the packets is an integral multiple of the encryption block size.

5. The client terminal according to claim 1,
    wherein a first packeting technique and a second packeting technique are switched in accordance with a communication state of a network connecting the client terminal to the streaming server,
    wherein the communication state of the network comprises error rate of transmission,
    wherein the first packeting technique comprises packeting by storing portions of prior and posterior stream data into an extended area along with the stream data so that a size of the stream data distributed to every one of the packets is an integral multiple of the encryption block size, and
    wherein the second packeting technique comprises packeting stream data in units of an integral multiple of the encryption block size.

6. A client terminal connected to a streaming server, the client terminal comprising:
    a central processing unit;
    a receiving unit for receiving packets from the streaming server,
        wherein the streaming server transmits the packets of stream data based on packeting control information,
        wherein the packeting control information is added to the stream data after encryption of the stream data,
        wherein the stream data is generated based on compression-encoding of at least one of image data and audio data, and
        wherein the encryption of the stream data comprises encrypting every predetermined unit of the stream data from a leading portion of the predetermined unit based on an encryption block size smaller than a packet size;
        wherein remainder data of the stream data is not encrypted when a size of the remainder data is smaller than the encryption block size;
    an inverse-packeting unit for inverse-packeting the packets for the stream data;
    a decrypting unit for decrypting encrypted portion of the stream data; and
    a decoding unit for decoding the stream data into the at least one of image data and audio data, wherein a packet is adapted, during packeting of the packets, so that portions of at least one of prior stream data and posterior stream data are packeted along with the stream data into the packet so that size of the stream data distributed to every one of the packets is an integral multiple of the encryption block size.

7. The client terminal according to claim 6, wherein the portions are stored into an extended area.

8. A method for decoding data, the method comprising:
    generating, by a central processing unit, stream data by compression-encoding at least one of image data and audio data;
    encrypting, by the central processing unit, every predetermined unit of the stream data from a leading portion of the predetermined unit based on an encryption block size smaller than a packet size, wherein remainder data of the stream data that is less than the encryption block size is not encrypted;

adding, after encryption of the stream data, packeting control information to the stream data to provide the stream data with a predetermined file form;
packeting the stream data into packets based on the packeting control information;
transmitting the packets to a client terminal;
receiving the packets;
inverse-packeting the packets for the stream data;
decrypting an encrypted portion of the stream data; and
decoding the stream data into the at least one of image data and audio data.

9. The method according to claim 8, wherein the compression-encoding is based on predictive encoding.

10. The method according to claim 9, wherein the predetermined unit is a frame of the image data.

11. The method according to claim 8, wherein a packet is adapted, during packeting of the packets, so that portions of at least one of prior stream data and posterior stream data are stored into an extended area along with the stream data so that size of the stream data distributed to every one of the packets is an integral multiple of the encryption block size.

12. The method according to claim 8,
wherein a first packeting technique and a second packeting technique are switched in accordance with a communication state of a network connecting the client terminal to a streaming server transmitting the packets to the client terminal,
wherein the communication state of the network comprises error rate of transmission,
wherein the first packeting technique comprises packeting by storing portions of prior and posterior stream data into an extended area along with the stream data so that a size of the stream data distributed to every one of the packets is an integral multiple of the encryption block size, and
wherein the second packeting technique comprises packeting stream data in units of an integral multiple of the encryption block size.

13. A method for decoding data, the method comprising:
generating, by a central processing unit, stream data by compression-encoding at least one of image data and audio data;
encrypting, by the central processing unit, every predetermined unit of the stream data from a leading portion of the predetermined unit based on an encryption block size smaller than a packet size;
adding, after encryption of the stream data, packeting control information to the stream data to provide the stream data with a predetermined file form;
packeting, by the central processing unit, the stream data into packets based on the packeting control information;
transmitting the packets to a client terminal;
receiving the packets;
inverse-packeting the packets for the stream data; decrypting an encrypted portion of the stream data; and
decoding the stream data into the at least one of image data and audio data, wherein a packet is adapted, during the packeting, so that portions of at least one of prior stream data and posterior stream data are stored into an extended area along with the stream data so that size of the stream data distributed to every one of the packets is an integral multiple of the encryption block size,
wherein remainder data of the stream data is not encrypted when a size of the remainder data is smaller than the encryption block size.

14. The method according to claim 13, wherein the portions are stored into an extended area.

15. A non-transitory recording medium storing a program for causing a computer to execute a method, the method comprising:
generating stream data by compression-encoding at least one of image data and audio data;
encrypting every predetermined unit of the stream data from a leading portion of the predetermined unit based on an encryption block size smaller than a packet size, wherein remainder data of the stream data that is less than the encryption block size is not encrypted;
adding, after encryption of the stream data, packeting control information to the stream data to provide the stream data with a predetermined file form;
packeting the stream data into packets based on the packeting control information;
transmitting the packets to a client terminal;
receiving the packets;
inverse-packeting the packets for the stream data;
decrypting an encrypted portion of the stream data; and
decoding the stream data into the at least one of image data and audio data.

16. The non-transitory recording medium according to claim 15, wherein the compression-encoding is based on predictive encoding.

17. The non-transitory recording medium according to claim 16, wherein the predetermined unit is a frame of the image data.

18. The non-transitory recording medium according to claim 15, wherein a packet is adapted, during packeting of the packets, so that portions of at least one of prior stream data and posterior stream data are stored into an extended area along with the stream data so that size of the stream data distributed to every one of the packets is an integral multiple of the encryption block size.

19. The non-transitory recording medium according to claim 15,
wherein a first packeting technique and a second packeting technique are switched in accordance with a communication state of a network connecting the client terminal to a streaming server transmitting the packets to the client terminal,
wherein the communication state of the network comprises error rate of transmission,
wherein the first packeting technique comprises packeting by storing portions of prior and posterior stream data into an extended area along with the stream data so that a size of the stream data distributed to every one of the packets is an integral multiple of the encryption block size, and
wherein the second packeting technique comprises packeting stream data in units of an integral multiple of the encryption block size.

20. A non-transitory recording medium storing a program for causing a computer to execute a method, the method comprising:
generating stream data by compression-encoding at least one of image data and audio data;
encrypting every predetermined unit of the stream data from a leading portion of the predetermined unit based on an encryption block size smaller than a packet size;
adding, after encryption of the stream data, packeting control information to the stream data to provide the stream data with a predetermined file form;
packeting the stream data into packets based on the packeting control information;
transmitting the packets to a client terminal;
receiving the packets;

inverse-packeting the packets for the stream data;
decrypting encrypted portion of the stream data; and
decoding the stream data into the at least one of image data and audio data, wherein a packet is adapted, during the packeting, so that portions of at least one of prior stream data and posterior stream data are stored into an extended area along with the stream data so that size of the stream data distributed to every one of the packets is an integral multiple of the encryption block size, wherein remainder data of the stream data is not encrypted when a size of the remainder data is smaller than the encryption block size.

21. The non-transitory recording medium according to claim 20, wherein portions of at least one of the prior stream data and the posterior stream data are inserted into an extended area.

* * * * *